(12) United States Patent
Gao et al.

(10) Patent No.: US 8,730,895 B2
(45) Date of Patent: May 20, 2014

(54) METHOD FOR APERIODIC SRS SUBFRAME CONFIGURATION AND SIGNALING

(75) Inventors: Shiwei Gao, Nepean (CA); Jack Smith, Valley View, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 310 days.

(21) Appl. No.: 13/343,885

(22) Filed: Jan. 5, 2012

(65) Prior Publication Data

US 2012/0176977 A1  Jul. 12, 2012

Related U.S. Application Data

(60) Provisional application No. 61/430,705, filed on Jan. 7, 2011.

(51) Int. Cl.
*H04W 4/00* (2009.01)

(52) U.S. Cl.
USPC .......................................................... 370/329

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/523–520, 521–529
See application file for complete search history.

(56) References Cited

U.S. PATENT DOCUMENTS

| | | | | |
|---|---|---|---|---|
| 2009/0279459 | A1* | 11/2009 | Muharemovic et al. | 370/280 |
| 2010/0034312 | A1* | 2/2010 | Muharemovic et al. | 375/267 |
| 2010/0067410 | A1* | 3/2010 | He et al. | 370/280 |
| 2010/0080187 | A1* | 4/2010 | Papasakellariou et al. | 370/329 |
| 2010/0273494 | A1* | 10/2010 | Iwai et al. | 455/450 |
| 2011/0249578 | A1* | 10/2011 | Nayeb Nazar et al. | 370/252 |
| 2012/0113967 | A1* | 5/2012 | Smith et al. | 370/338 |
| 2013/0128855 | A1* | 5/2013 | Noh et al. | 370/329 |

FOREIGN PATENT DOCUMENTS

WO  2012021139 A1  2/2012

OTHER PUBLICATIONS

International Search Report and Written Opinion for PCT Application No. PCT/US2012/020263, mailed Mar. 13, 2012.
Panasonic, "Sounding RS parameters," 3GPP Draft; R1-081201, 3rd Generation Partnership Project (3GPP), Mobile Competence Centre; 650t Route Des Lucioles; F-06921 Sophia-Antipolis Cedex France, vol. RAN WG1, no. Shenzhen, China; Mar. 26, 2008.
Motorola, "On Dynamic Aperiodic SRS Transmission Timing," 3GPP Draft; R1-105632, on Dynamic Aperiodic SRS Transmission Timing, 3rd Generation Partnership Project (3GPP), Mobile Competence Centre; 650, Route Des Lucioles; F-06921 Sophia-Antipolis Cedex; France, vol. RAN WG1, no. Xian; Oct. 5, 2010.
Texas Instruments, "Resource Allocation and Signaling for Aperiodic Sounding," 3GPP Draft; R1-105291 TI Resource Allocation and Signaling for Aperiodic SRS V2, 3rd Generation Partnership Project (3GPP), Mobile Competence Centre; 650, Route Des Lucioles; F-06921 Sophia-Antipolis Cedex; France, vol. RAN WG1, no. Xi an; 20101011, Oct. 5, 2010.

(Continued)

*Primary Examiner* — Jung-Jen Liu
(74) *Attorney, Agent, or Firm* — Cantor Colburn LLP

(57) ABSTRACT

A method, system and computer-usable medium for configuring UE-specific A-SRS subframes. More specifically, UE-specific Aperiodic Sounding Reference Signal (A-SRS) subframes are defined only within a radio subframe.

10 Claims, 6 Drawing Sheets

(56) References Cited

OTHER PUBLICATIONS

Pantech, "Further consideration on Aperiodic SRS signaling", 3GPP Draft; R1-102841, 3rd Generation Partnership Project (3GPP), Mobile Competence Centre ; 650, Route Des Lucioles ; F-06921 Sophia-Antipolis Cedex; France, vol. RAN WG1, no. Montreal, Canada; May 6, 2010.

Qualcomm Incorporated, "SRS Enhancements for LTE-A," 3GPP Draft; R1-102341 SRS Enhancements for LTE-A, 3rd Generation Partnership Project (3GPP), Mobile Competence Centre; 650, Route Des Lucioles; F-06921 Sophia-Antipolis Cedex ; France, vol. RAN WG1, no. Beijing, China; Apr. 6, 2010.

International Search Report and Written Opinion dated Mar. 13, 2012 for PCT Application No. PCT/US2012/020263.

Motorola; "On Dynamic Aperiodic SRS Transmission Timing"; 3GPP Draft; 3rd Generation Partnership Project; Mobile Compentence Centre; p. 1-2; Oct. 11-15, 2010; retrieved on Oct. 5, 2010, downloaded by EPO on Oct. 5, 2010.

Panasonic; "Sounding RS Parameters"; 3GPP Draft, 3rd Generation Partnership Project; Mobile Competence Cetre; p. 1-7; Mar. 31-Apr. 4, 2008; retrieved Mar. 26, 2008.

Pantech; "Further Consideration on Aperiodic SRS Signaling"; 3GPP Draft; 3rd Generation Partnership Project; Mobile Competence Centre; p. 1-3; May 10-14, 2010; retrieved on May 6, 2012; downloaded by EPO on Jun. 12, 2010.

Qualcomm Incorporated; "SRS Enhancements for LTE-A"; 3GPP Draft; 3rd Generation Partnership Project; Mobile Competence Centre; p. 1-4; Apr. 12-16, 2010; retrieved on Apr. 6, 2010; downloaded by EPO on Jun. 12, 2010.

Texas Instruments; "Resource Allocation and Signaling for Aperiodic Sounding"; 3GPP Draft; 3rd Generation Partnership Project; Mobile Competence Centre; p. 1-4; Oct. 11-15, 2010; retrieved on Oct. 5, 2012; downloaded by EPO on Oct. 5, 2010.

3GPP TSG-RAN TS 36.211, 3rd Generation Partnership Project; Technical Specification Group Radio Access Network; Evolved Universal Terrestrial Radio Access (E-UTRA); Physical channels and modulation (Release 8), May 2009.

3GPP TSG-RAN TS 36.213, 3rd Generation Partnership Project; Technical Specification Group Radio Access Network; Evolved Universal Terrestrial Radio Access (E-UTRA); Physical layer procedures ( Release 8), May 2009.

\* cited by examiner

| SRS bandwidth configuration $C_{SRS}$ | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

*Figure 3*
*(Prior Art)*

| SRS Configuration Index $I_{SRS}$ | SRS Periodicity $T_{SRS}$ (ms) | SRS Subframe Offset $T_{offset}$ |
|---|---|---|
| 0 – 1 | 2 | $I_{SRS}$ |
| 2 – 6 | 5 | $I_{SRS} - 2$ |
| 7 – 16 | 10 | $I_{SRS} - 7$ |
| 17 – 36 | 20 | $I_{SRS} - 17$ |
| 37 – 76 | 40 | $I_{SRS} - 37$ |
| 77 – 156 | 80 | $I_{SRS} - 77$ |
| 157 – 316 | 160 | $I_{SRS} - 157$ |
| 317 – 636 | 320 | $I_{SRS} - 317$ |
| 637 – 1023 | reserved | reserved |

*Figure 4*
*(Prior Art)*

| A-SRS Configuration Index ($K_{ASRS}$) | A-SRS Subframe Increment in $S_i$ ($A_{inc}$) | A-SRS Start Subframe in $S_i$ ($A_{start}$) |
|---|---|---|
| 0 | 1 | $K_{ASRS}$ |
| 1 to 2 | 2 | $K_{ASRS} - 1$ |
| 3 to 5 | 3 | $K_{ASRS} - 3$ |
| 6 to 9 | 4 | $K_{ASRS} - 6$ |
| 10 to 14 | 5 | $K_{ASRS} - 10$ |
| 15 to 18 | 6 | $K_{ASRS} - 15$ |
| 19 to 21 | 7 | $K_{ASRS} - 19$ |
| 22 to 23 | 8 | $K_{ASRS} - 22$ |
| 24 | 9 | $K_{ASRS} - 24$ |
| 25 to 34 | 10 | $K_{ASRS} - 25$ |

*Figure 7*

METHOD FOR APERIODIC SRS SUBFRAME CONFIGURATION AND SIGNALING

CROSS-REFERENCE TO RELATED APPLICATIONS

This application claims the benefit under 35 U.S.C. §119(e) of U.S. Provisional Application No. 61/430,705, filed Jan. 7, 2011, entitled "Method for Aperiodic SRS Subframe Configuration and Signaling." The disclosure of U.S. Provisional Application No. 61/430,705 is incorporated herein by reference in its entirety.

BACKGROUND

1. Field

The present invention is directed in general to communications systems and methods for operating same. In one aspect, the present invention relates to devices and methods for aperiodic SRS subframe configuration and signaling.

2. Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B) that can provide user equipment (UE) with access to other components in a telecommunications system.

In mobile communication systems such as an E-UTRAN, the access device provides radio accesses to one or more UEs. The access device comprises a packet scheduler for allocating uplink (UL) and downlink (DL) data transmission resources among all the UEs communicating to the access device. The functions of the scheduler include, among others, dividing the available air interface capacity between the UEs, deciding the resources (e.g. sub-carrier frequencies and timing) to be used for each UE's packet data transmission, and monitoring packet allocation and system load. The scheduler allocates physical layer resources for physical downlink shared channel (PDSCH) and physical uplink shared channel (PUSCH) data transmissions, and sends scheduling information to the UEs through a control channel. The UEs refer to the scheduling information for the timing, frequency, data block size, modulation and coding of uplink and downlink transmissions.

In certain communication standards, such as the 3GPP ($3^{rd}$ Generation Partnership Project) communication standard, uplink spatial multiplexing of up to four layers may be supported by LTE-Advanced. Prior to supporting spatial multiplexing, only a single-antenna port mode of operation was available for the uplink. Thus, the methodology defined in earlier releases of the 3GPP communication standard (e.g., 3GPP Releases 8 and 9) for obtaining channel state information was designed to only measure the channel between a single uplink transmission antenna and the eNB within any single subframe. To support the new uplink MIMO capabilities, it is desirable for the next release of the 3GPP communication standard (e.g., 3GPP release 10) to allow simultaneous channel sounding from multiple UE transmission antennas. Because each uplink transmission antenna requires its own set of orthogonal sounding resources, a new more-efficient sounding methodology is desirable for this next release.

The method used for sounding the channel for the earlier release UEs was known as periodic sounding since this method configures each Radio Resource Control (RRC) Connected UE to transmit a known signal at periodic intervals so that the eNB can measure the channel. Consequently, each UE consumes a fixed amount of resources for that transmission periodically (e.g., every 10 ms) regardless of whether the UE has uplink data to convey or not. To improve the efficiency in the next release, a new aperiodic sounding methodology (i.e., a sounding methodology of irregular occurrence) is being defined which allows the eNB to command the UE to perform aperiodic sounding only when it is required by the eNB. This aperiodic sounding methodology will likely improve efficiency since it will allow the resources to be consumed only when it is beneficial to do so (e.g., only when the UE has uplink data to convey). The new aperiodic sounding methodology is being defined as a complementary mechanism for 3GPP Release 10 and later UEs. The methodology can be used in conjunction with the legacy periodic sounding mechanism in a process where the periodic sounding is configured for each Release 10 RRC Connected UE, but with a longer period (e.g., 20-40 ms or longer) to provide the eNB some information regarding the channel to maintain timing alignment, adjust the UE power control, etc, and then the aperiodic sounding methodology is used to obtain more frequent channel state updates as needed once data comes into the uplink buffer.

In a LTE Release-8 system, the eNB may configure the periodic sounding methodology for a UE to transmit SRS in just one subframe or periodically in multiple subframes. One purpose of a Release 8/9 sounding reference signal (SRS) transmission is to help the eNB estimate the uplink channel quality to support frequency-selective uplink scheduling. In addition, SRS may also be used to control uplink power or uplink timing advance.

Channel sounding is a method used in wireless communication systems to obtain uplink channel state information (CSI) for assigning modulation and coding schemes (MCS), selecting rank and antenna precoding matrix in case of multiple Input and Multiple Output (MIMO) operation, and for frequency selective scheduling for uplink transmission. A known sounding signal waveform is typically transmitted between a transmitter and a receiver, and the channel state information is estimated at the receiver based on the known sounding signal. In 3GPP LTE Release 8, a sounding reference signal (SRS) is typically transmitted periodically from each RRC_CONNECTED UE to the eNB to facilitate uplink timing correction, scheduling and link adaptation. The last symbol of a subframe configured for SRS transmission is used for SRS transmission in LTE Frequency Division Duplexing (FDD) systems as shown in FIG. 1. In LTE, uplink transmissions are organized into radio frames each include 10 subframes ranging from subframe 0 to subframe 9. A subframe is further divided into two slots. In addition, radio frames are indexed from 0 to 1023 and each of the indexed radio frame is referred to as a system frame.

In 3GPP Release 8, cell-specific SRS resources are defined in both frequency and time domains in terms of SRS period, subframe offsets, and SRS bandwidth and are semi-statically configured through RRC signaling in a cell. The cell specific subframe configuration is shown in FIG. 2, and the sounding reference signal subframes are the subframes satisfying $\lfloor n_s/$ $2\lceil \text{mod} T_{SFC} \in \Delta_{SFC}$, where $n_s=0, 1, \ldots, 19$ is the slot index within a frame. For example, the cell-specific SRS subframes when srs-SubframeConfig=0 are the subframes {0,1, 2, 3, 4, 5, 6, 7, 8, 9}, (i.e. all the subframes in each radio frame). In another example, the cell-specific SRS subframes when srs-SubframeConfig=2 are the subframes {1, 3, 5, 7, 9}.

In 3GPP Release 8, SRS bandwidth configuration is shown in FIG. 2 for a system bandwidth between 40 and 60 Resource Blocks (RBs), where one RB includes 12 subcarriers. For a given cell specific SRS bandwidth configuration index $C_{SRS}$, the absolute SRS bandwidth for a UE-specific bandwidth configuration $B_{SRS}$ depends on the system bandwidth. SRS bandwidth configurations for other system bandwidths can be found in the 3GPP specification. Each UE is assigned semi-statically with a UE-specific periodic SRS resource determined by a UE-specific SRS bandwidth, $B_{SRS}$, a frequency domain position, $n_{RRC}$, a transmission comb, $k_{TC}$, a cyclic shift (CS), a subframe period, $T_{SRS}$, and a subframe offset, $T_{offset}$. In Rel-10 multiple configurations are also supported for UE-specific aperiodic SRS transmissions, which can be triggered by a uplink data grant.

In 3GPP Release 8, UE-specific periodic SRS subframe configuration (subframe period and offset) in LTE FDD is shown in FIG. 3, where the SRS subframes for a UE are the subframes satisfying $(10 \cdot n_f + k_{SRS} - T_{offset}) \text{mod} T_{SRS} = 0$, where $n_f$ is the system frame number, and $k_{SRS} = \{0, 1, \ldots, 9\}$ is the subframe index within the frame.

In 3GPP Release 10, up to four UE Tx antennas are supported for uplink MIMO. Since separate SRS resources are needed for each Tx antenna, there can be a shortage of SRS resources. To address this issue, aperiodic SRS (A-SRS) has been introduced in which SRS can be dynamically scheduled or triggered by an eNB in an as needed basis through uplink data grants. It has been agreed that similar to the periodic SRS case, each UE is also assigned with a UE-specific A-SRS subframe configuration, i.e. subframes in which A-SRS can be scheduled or triggered. Accordingly, it would be desirable to provide a configuration of UE-specific A-SRS subframes.

One possibility would be to adopt the Release 8 UE-specific periodic SRS subframe configuration as shown in FIG. 4. An issue with this type of configuration is that the configuration limits the A-SRS subframes for a UE to periodical subframes with possible periodicities of 2 ms, 5 ms, 10 ms and so on. This reduces the available opportunities for A-SRS transmission. For example, when the cell-specific SRS subframe configuration of 13 or 14 is used as shown in FIG. 2, the minimum period for UE-specific A-SRS subframes is 5 ms for the odd subframes even though there are 7 or 8 subframes available for SRS transmission within a radio frame. Thus it limits two adjacent A-SRS transmissions to at least 5 ms for UEs configured on those odd subframes.

BRIEF DESCRIPTION OF THE DRAWINGS

The present invention may be understood, and its numerous objects, features and advantages obtained, when the following detailed description is considered in conjunction with the following drawings, in which:

FIG. 3, labeled Prior Art, shows a table of sounding reference signal subframe configurations.

FIG. 4, labeled Prior Art, shows a table of sounding reference signal subframe configurations.

FIG. 7 shows a table of a sounding reference signal subframe configuration.

DETAILED DESCRIPTION

A method, system and computer-usable medium are provided configuring UE-specific A-SRS subframes. More specifically, in one embodiment, to mitigate any potential shortcomings of using the Release 8 UE-specific SRS subframe configuration for UE-specific A-SRS subframe configuration, the UE-specific A-SRS subframe configuration is based on a 10 ms radio frame as in the cell-specific SRS subframe case in Release 8. In other words, the UE-specific A-SRS subframes are defined only within a radio subframe.

More specifically, in certain embodiments, a bit map approach is used. In the bit map approach, a predetermined number of bits (e.g., 10-bits) are used for the UE-specific A-SRS subframe configuration and each bit is associated with one subframe within a radio frame. When the $n^{th}$ bit is assigned a predefined value (such as "1"), the $n^{th}$ subframe in a system frame is configured as an A-SRS subframe for the UE to whom the bitmap is sent.

In other embodiments, a state base approach is used. In the state base approach, within a certain radio frame (e.g., a 10 ms radio frame), a UE is configured with a periodicity and offset. The maximum period is related to the radio frame (e.g., 10 ms for a 10 ms radio frame) and the minimum offset also defined (e.g., 1 ms) for the radio frame. When a certain period (e.g., a 1 ms period) is configured, a UE can schedule A-SRS in two adjacent subframes if they are also included in the cell specific subframe configuration. When another period (e.g., a 10 ms period) is configured, only one subframe can be schedule within a radio frame for A-SRS transmission.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or Obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 5:
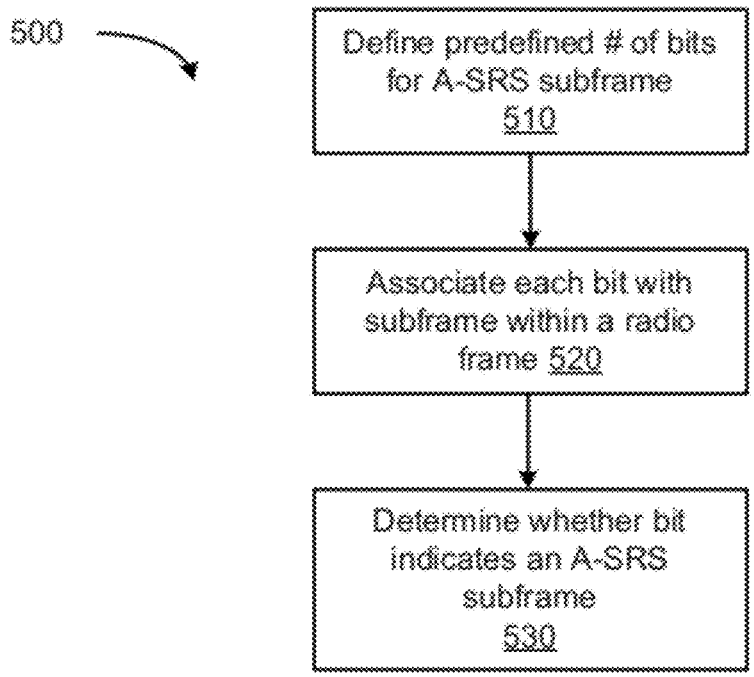
FIG. 5 shows a flow chart of the operation of a bit map approach.

Referring to FIG. 5, a flow chart of a bit map approach 500 is shown. More specifically, in the bit map approach, a predetermined number of bits (e.g., 10-bits) are defined for the UE-specific A-SRS subframe configuration and each bit is associated with one subframe within a radio frame. When the $n^{th}$ bit is assigned a predefined value (such as "1"), the $n^{th}$ subframe in a system frame is configured as an A-SRS subframe for the UE to whom the bitmap is sent.

With the bit map approach, at step 510 a predetermined number of bits (e.g., 10 bits) are used for the UE-specific A-SRS subframe configuration as follows:

$\{b_0, b_1, b_2, b_3, b_4, b_5, b_6, b_7, b_8, b_9\}$

Next, at step 520, bit $b_i$ (i=0, 1, 2, ..., 9) is associated with the $i^{th}$ subframe within a radio frame. Next at step 530, the associated bits are used to determine whether a corresponding subframe is configured. For example, when $b_i$ is set to "1", the corresponding subframe is configured as an A-SRS subframe for the UE. If $b_i$ is set to "0", the $i^{th}$ subframe is not configured as an A-SRS subframe for the UE.

For example, for cell specific SRS subframe configuration srs-SubframeConfig=14, when a UE is configured with bit map {0101010000}, then its A-SRS subframes are subframes 1, 3, and 5. This would not be possible if Rel-8 type of UE-specific subframe configuration shown in Table 3 in used.

Note that in this example, srs-SubframeConfig=14 defines 8 subframes (i.e., subframes {0,1, 2, 3, 4, 5, 6, 8}) as cell-specific subframes. In contrast, the bitmap contains 10 bits, so bitmap positions $b_7$ and $b_9$ are associated with subframes within the system frame that aren't cell-specific sounding subframes, and hence, are not valid candidates to be assigned as UE-specific A-SRS subframes. There are three different options on how to interpret any bit in the bitmap that doesn't correspond to a cell-specific sounding subframe. The first option is to simply ignore the bitmap values in these positions since they aren't viable UE-specific sounding subframes. The second option is to set these bit positions to a known state so that they might be used to detect possible errors in the RRC configuration. The third option is to use these bit positions as unused bits or codepoints that can be used to send additional information to the UE when future needs arise.

Figure 6:
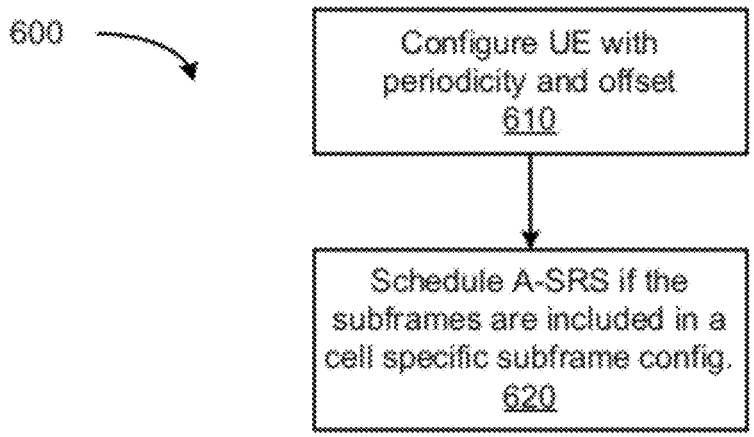
FIG. 6 shows a flow chart of the operation of a state base approach.

Referring to FIG. 6, a flow chart of the operation of a state base approach 600 is shown. In the state base approach, at step 610 within a certain radio frame (e.g., a 11.0 ms radio frame), a UE is configured with a periodicity and offset at step 610. The maximum period is related to the radio frame (e.g., 10 ms for a 10 ms radio frame) and the minimum offset also defined (e.g., 1 ms). At step 620, when a certain period (e.g., a 1 ms period) is configured, a UE can schedule A-SRS in two adjacent subframes if they are also included in the cell specific subframe configuration. When another period (e.g., a 10 ms period) is configured, only one subframe can be schedule within a radio frame for A-SRS transmission.

Figures 1, 2:
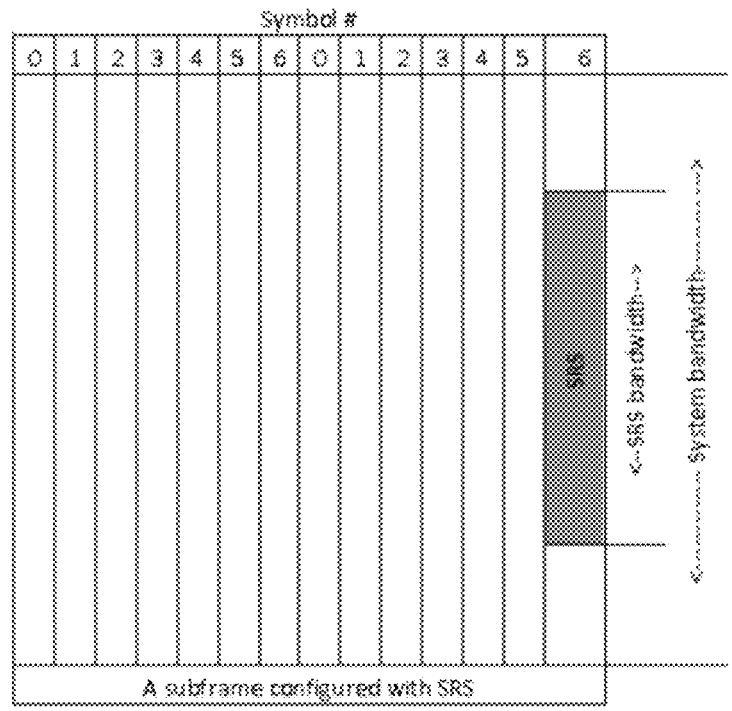
FIG. 1, labeled Prior Art, shows a block diagram of an SRS location in an LTE subframe.
FIG. 2, labeled Prior Art, shows a table of sounding reference signal subframe configurations.

With the state base approach, for the cell-specific SRS subframe configurations that are defined (such as in the Table shown in FIG. 2), let $S_i$ be the complete set of subframes within a system frame that are configured as cell-specific SRS subframes when srs-SubframeConfig=i. More specifically, $S_i$ is defined as $S_1=\{SF_0, SF_1, \ldots, SF_{N_f-1}\}$, i=0,1,2 . . . ,15 and $N_f$=10, where $SF_j$ is the $j^{th}$ cell-specific SRS subframe within the set, and $N_i$ is the number of cell-specific SRS subframes contained in the set $S_i$. As an example, when the cell-specific SRS subframes are configured using a configuration index of srs-SubframeConfig=2 (as shown in the Table shown in FIG. 2), we have $S_2=\{SF_0, SF_1, \ldots, SF_4\}=\{1,3,5,7,9\}$ and $SF_0$ corresponds to subframe 1, $SF_1$ corresponds to subframe 3, and so on.

A particular UE may be assigned all or a subset of the subframes within set $S_i$ as their UE-specific A-SRS subframes. The procedure for indicating the set of UE-specific A-SRS subframes that are configured for a UE includes providing the UE with an indication of which subframe in set $S_i$ is the initial subframe in the UE's set of UE-specific subframes, along with an indication that each $P^{th}$ ($P \in \{1, 2, \ldots, 9\}$) subframe after that in set $S_i$ is also included in the UE's set of UE-specific subframes. The actual signalling of this information may be done using a table such as illustrated in FIG. 7. Here, the UE-specific A-SRS subframes are configured by sending the UE an index value, denoted as $K_{ASRS}$ (see column 1). The UE uses this value, along with the Table shown in FIG. 7, to determine the values $A_{start}$ and $A_{inc}$, where $A_{start}$ indicates which subframe in set $S_i$ is the starting subframe to include in the UE's set of UE-specific A-SRS subframes and $A_{inc}$ indicates that each subframe after that in set $S_i$ that is separated by an integer multiple of $A_{inc}$ is also included in the UE's set of UE-specific A-SRS subframes. In other words, for a given cell specific SRS subframe configuration with srs-SubframeConfig=i, the UE specific A-SRS subframes are subframes $SF_n$ in set $S_i$ satisfying $n-(A_{start}+kA_{inc})=0$ for k=0, 1, 2, ..., 9 and (n=0, 1, ..., $N_i$-1).

For example, consider the case where the cell-specific SRS subframes are configured using the parameter srs-SubframeConfig=2. This case gives rise to the set $S_2=\{SF_0, SF_1, \ldots, SF_4\}=\{0,3,5,7,9\}$ according to the Table shown in FIG. 2. The UE-specific A-SRS subframes for a given UE can then be configured by providing the UE with an indication of $K_{ASRS}=1$. If so, the UE then uses the Table shown in FIG. 7 to determine that it should use the values of $A_{start}=K_{ASRS}-1=0$ and $A_{inc}=2$ when constructing its set of UE-specific A-SRS subframes. Applying these value to set $S_2$, the UE knows that the initial subframe in its set of UE-specific A-SRS subframes is indexed by the value n=$A_{start}$ (i.e., since $A_{start}$=0, the initial subframe in the UE's UE-specific set is given by $SF_0$). Thus, subframe #1 is the initial subframe in the UE's set of UE-specific A-SRS subframes. The UE then proceeds by also adding every subframe in set $S_2$ after $SF_0$ that is separated from $SF_0$ by an integer multiple of $A_{inc}$. More specifically, the UE adds the subframe associated with index n=$A_{start}$+$A_{inc}$ (i.e., index n=0+2=2) to its set of UE-specific A-SRS subframes. Thus, the UE adds subframe $SF_2$=5 to its set. The UE then adds the subframe associated with index n=$A_{start}$+2$A_{inc}$ (i.e., index n=0+2×2=4) to its set of UE-specific A-SRS subframes. Thus, the UE adds subframe $SF_4$=9 to its set of UE-specific subframes. If the number of subframes in set $S_2$ were larger, the UE would continue with this process, but since this is the last subframe in set $S_2$, the UE ceases constructing the set of UE-specific A-SRS subframes, with the final set consisting of the subframes $\{SF_0, SF_4, SF_9\}=\{1,5, 9\}$.

One benefit of the state base approach is that only 6 bits are needed for signaling, a saving of 4 bits signaling overhead comparing to bit map approach.

Figure 8:
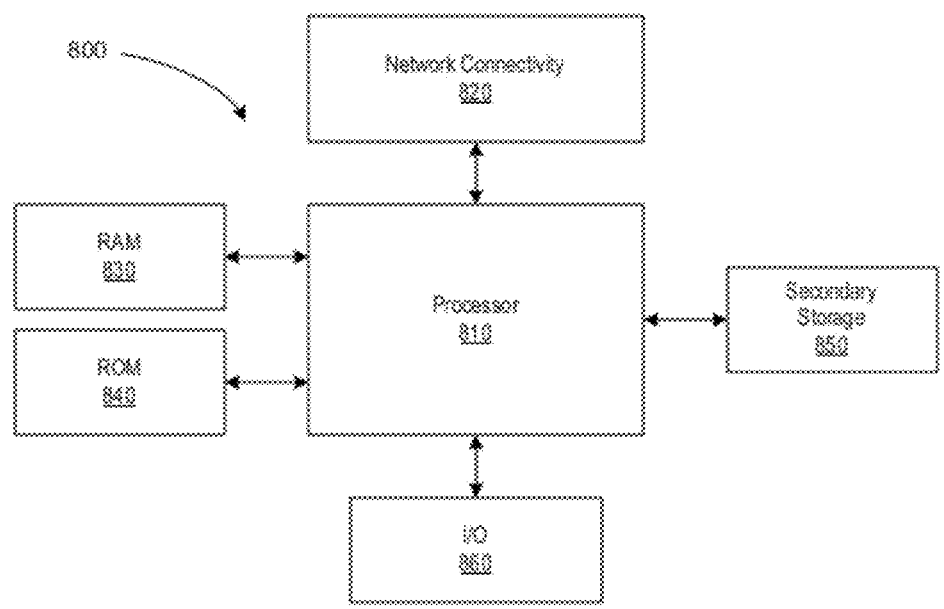
FIG. 8 depicts an exemplary system in which the present invention may be implemented.

FIG. 8 illustrates an example of a system 800 suitable for implementing one or more embodiments disclosed herein. In various embodiments, the system 800 comprises a processor 810, which may be referred to as a central processor unit (CPU) or digital signal processor (DSP), network connectivity devices 820, random access memory (RAM) 830, read only memory (ROM) 840, secondary storage 850, and input/output (I/O) devices 860. In some embodiments, some of these components may not be present or may be combined in various combinations with one another or with other components not shown. These components may be located in a single physical entity or in more than one physical entity. Any actions described herein as being taken by the processor 810 might be taken by the processor 810 alone or by the processor 810 in conjunction with one or more components shown or not shown in FIG. 8.

The processor 810 executes instructions, codes, computer programs, or scripts that it might access from the network connectivity devices 820, RAM 830, or ROM 840. While only one processor 810 is shown, multiple processors may be present. Thus, while instructions may be discussed as being executed by a processor 810, the instructions may be executed simultaneously, serially, or otherwise by one or multiple processors 810 implemented as one or more CPU chips.

In various embodiments, the network connectivity devices 820 may take the form of modems, modem banks, Ethernet devices, universal serial bus (USB) interface devices, serial interfaces, token ring devices, fiber distributed data interface (MDT) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 820 may enable the processor 810 to communicate with the Internet or one or more telecommunications networks or other networks from which the processor 810 might receive information or to which the processor 810 might output information.

The network connectivity devices 820 may also be capable of transmitting or receiving data wirelessly in the form of electromagnetic waves, such as radio frequency signals or microwave frequency signals. Information transmitted or received by the network connectivity devices 820 may include data that has been processed by the processor 810 or instructions that are to be executed by processor 810. The data may be ordered according to different sequences as may be desirable for either processing or generating the data or transmitting or receiving the data.

In various embodiments, the RAM 830 may be used to store volatile data and instructions that are executed by the processor 810. The ROM 840 shown in FIG. 8 may be used to store instructions and perhaps data that are read during execution of the instructions. Access to both RAM 830 and ROM 840 is typically faster than to secondary storage 850. The secondary storage 850 is typically comprised of one or more disk drives or tape drives and may be used for non-volatile storage of data or as an over-flow data storage device if RAM 830 is not large enough to hold all working data. Secondary storage 850 may be used to store programs that are loaded into RAM 830 when such programs are selected for execution. The I/O devices 860 may include liquid crystal displays (LCDs), touch screen displays, keyboards, keypads, switches, dials, mice, track balls, voice recognizers, card readers, paper tape readers, printers, video monitors, or other well-known input/output devices.

Figure 9:
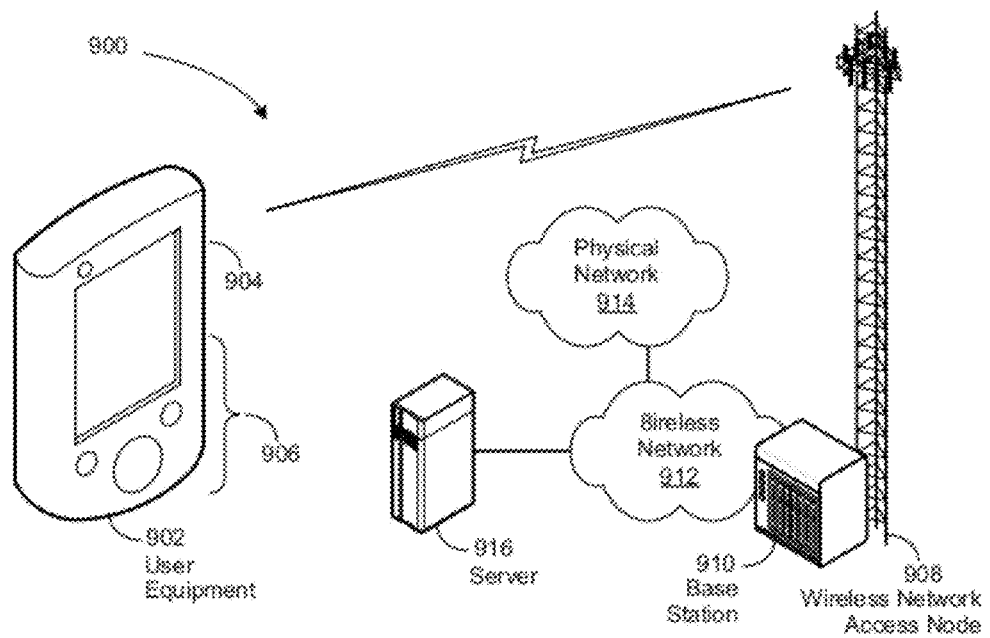
FIG. 9 shows a wireless communications system including an embodiment of a user equipment (UE).

FIG. 9 shows a wireless communications system including an embodiment of user equipment (DE) 902. Though illustrated as a mobile phone, the UE 902 may take various forms including a wireless handset, a pager, a personal digital assistant (FDA), a portable computer, a tablet computer, or a laptop computer. Many suitable devices combine some or all of these functions. In some embodiments, the UE 902 is not a general purpose computing device like a portable, laptop or tablet computer, but rather is a special-purpose communications device such as a mobile phone, a wireless handset, a pager, a PDA, or a telecommunications device installed in a vehicle. The UE 902 may likewise be a device, include a device, or be included in a device that has similar capabilities but that is not transportable, such as a desktop computer, a set-top box, or a network node. In these and other embodiments, the UE 902 may support specialized activities such as gaming, inventory control, job control, and/or task management functions, and so on.

In various embodiments, the UE 902 includes a display 904. The UE 902 likewise includes a touch-sensitive surface, a keyboard or other input keys 906 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 902 may likewise present options for the user to select, controls for the user to actuate, and cursors or other indicators for the user to direct.

The UE 902 may further accept data entry from the user, including numbers to dial or various parameter values for configuring the operation of the UE 902. The UE 902 may further execute one or more software or firmware applications in response to user commands. These applications may configure the UE 902 to perform various customized functions in response to user interaction. Additionally, the UE 902 may be programmed or configured over-the-air (OTA), for example from a wireless base station 910, a server 916, a wireless network access node 908, or a peer UE 902.

Among the various applications executable by the UE W00 are a web browser, which enables the display 904 to display a web page. The web page may be obtained via wireless communications with a wireless network access node 908, such as a cell tower, a peer UE 902, or any other wireless communication network 912 or system. In various embodiments, the wireless network 912 is coupled to a wired network 914, such as the Internet. Via the wireless network 912 and the wired network 914, the UE 902 has access to information on various servers, such as a server 916. The server 916 may provide content that may be shown on the display 904. Alternately, the UE 902 may access the wireless network 912 through a peer UE 902 acting as an intermediary, in a relay type or hop type of connection. Skilled practitioners of the art will recognized that many such embodiments are possible and the foregoing is not intended to limit the spirit, scope, or intention of the disclosure.

Figure 10:
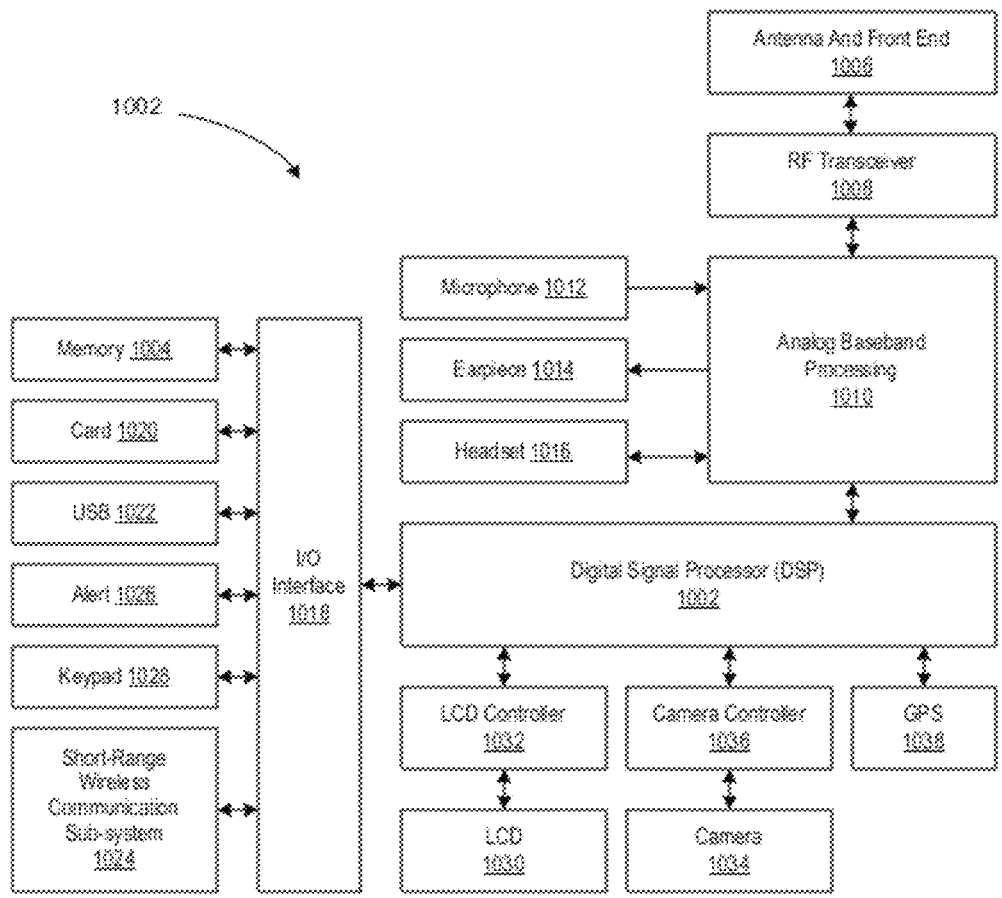
FIG. 10 is a simplified block diagram of an exemplary UE comprising a digital signal processor (DSP).

FIG. 10 depicts a block diagram of an exemplary user equipment (UE) 902 in which the present invention may be implemented. While various components of a UE 902 are depicted, various embodiments of the UE 902 may include a subset of the listed components or additional components not listed. As shown in FIG. 10, the UE 902 includes a digital signal processor (DSP) 1002 and a memory 1004. As shown, the UE 902 may further include an antenna and front end unit 1006, a radio frequency (RF) transceiver 1008, an analog baseband processing unit 1010, a microphone 1012, an earpiece speaker 1014, a headset port 1016, an input/output (I/O) interface 1018, a removable memory card 1020, a universal serial bus (USB) port 1022, a short range wireless communication sub-system 1024, an alert 1026, a keypad 1028, a liquid crystal display (LCD) 1030, which may include a touch sensitive surface, an LCD controller 1032, a charge-coupled device (CCD) camera 1034, a camera controller 1036, and a global positioning system (GPS) sensor 1038. In various embodiments, the UE 902 may include another kind of display that does not provide a touch sensitive screen. In an embodiment, the DSP 1002 may communicate directly with the memory 1004 without passing through the input/output interface 1018.

In various embodiments, the DSP 1002 or some other form of controller or central processing unit (CPU) operates to control the various components of the UE 902 in accordance with embedded software or firmware stored in memory 1004 or stored in memory contained within the DSP 1002 itself. In addition to the embedded software or firmware, the DSP 1002 may execute other applications stored in the memory 1004 or made available via information carrier media such as portable data storage media like the removable memory card 1020 or via wired or wireless network communications. The application software may comprise a compiled set of machine-readable instructions that configure the DSP 1002 to provide the desired functionality, or the application software may be high-level software instructions to be processed by an interpreter or compiler to indirectly configure the DSP 1002.

The antenna and front end unit 1006 may be provided to convert between wireless signals and electrical signals, enabling the UE 902 to send and receive information from a cellular network or some other available wireless communications network or from a peer UE 902. In an embodiment, the antenna and front end unit W06 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 1006 may include antenna tuning or impedance matching components, RF power amplifiers, or low noise amplifiers.

In various embodiments, the RF transceiver 1008 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1010 or the DSP 1002 or other central processing unit. In some embodiments, the RF Transceiver W08, portions of the Antenna and Front End 1006, and the analog base band processing unit 1010 may be combined in one or more processing units and/or application specific integrated circuits (ASICs).

The analog baseband processing unit 1010 may provide various analog processing of inputs and outputs, for example analog processing of inputs from the microphone 1012 and the headset 1016 and outputs to the earpiece 1014 and the headset 1016. To that end, the analog baseband processing unit 1010 may have ports for connecting to the built-in microphone 1012 and the earpiece speaker 1014 that enable the UE 902 to be used as a cell phone. The analog baseband processing unit 1010 may further include a port for connecting to a headset or other hands-free microphone and speaker configuration. The analog baseband processing unit 1010 may provide digital-to-analog conversion in one signal direction and analog-to-digital conversion in the opposing signal direction. In various embodiments, at least some of the functionality of the analog baseband processing unit 1010 may be provided by digital processing components, for example by the DSP 1002 or by other central processing units.

The DSP 1002 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1002 may perform modulation, coding, interleaving, and spreading, and for a receiver function the DSP 1002 may perform despreading, deinterleaving, decoding, and demodulation. In another embodiment, for example in an orthogonal frequency division multiplex access (OFDMA) technology application, for the transmitter function the DSP 1002 may perform modulation, coding, interleaving, inverse fast Fourier transforming, and cyclic prefix appending, and for a receiver function the DSP 1002 may perform cyclic prefix removal, fast Fourier transforming, deinterleaving, decoding, and demodulation. In other wireless technology applications, yet other signal processing functions and combinations of signal processing functions may be performed by the DSP 1002.

The DSP 1002 may communicate with a wireless network via the analog baseband processing unit 1010. In some embodiments, the communication may provide Internet connectivity, enabling a user to gain access to content on the Internet and to send and receive e-mail or text messages. The input/output interface 1018 interconnects the DSP 1002 and various memories and interfaces. The memory 1004 and the removable memory card 1020 may provide software and data to configure the operation of the DSP 1002. Among the interfaces may be the USB interface 1022 and the short range wireless communication sub-system 1024. The USB interface 1022 may be used to charge the UE 902 and may also enable the UE 902 to function as a peripheral device to exchange information with a personal computer or other computer system. The short range wireless communication sub-system 1024 may include an infrared port, a Bluetooth interface, an IEEE 802.11 compliant wireless interface, or any other short range wireless communication sub-system, which may enable the UE 902 to communicate wirelessly with other nearby mobile devices and/or wireless base stations.

The input/output interface 1018 may further connect the DSP 1002 to the alert 1026 that, when triggered, causes the UE 902 to provide a notice to the user, for example, by ringing, playing a melody, or vibrating. The alert 1026 may serve as a mechanism for alerting the user to any of various events such as an incoming call, a new text message, and an appointment reminder by silently vibrating, or by playing a specific pre-assigned melody for a particular caller.

The keypad 1028 couples to the DSP 1002 via the I/O interface 1018 to provide one mechanism for the user to make selections, enter information, and otherwise provide input to the UE 902. The keyboard 1028 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 1030, which may include touch screen capability and also display text and/or graphics to the user. The LCD controller 1032 couples the DSP 1002 to the LCD 1030.

The CCD camera 1034, if equipped, enables the UE 902 to take digital pictures. The DSP 1002 communicates with the CCD camera 1034 via the camera controller 1036. In another embodiment, a camera operating according to a technology other than Charge Coupled Device cameras may be employed. The GPS sensor 1038 is coupled to the DSP 1002 to decode global positioning system signals, thereby enabling the UE 902 to determine its position. Various other peripherals may also be included to provide additional functions, such as radio and television reception.

Figure 11:
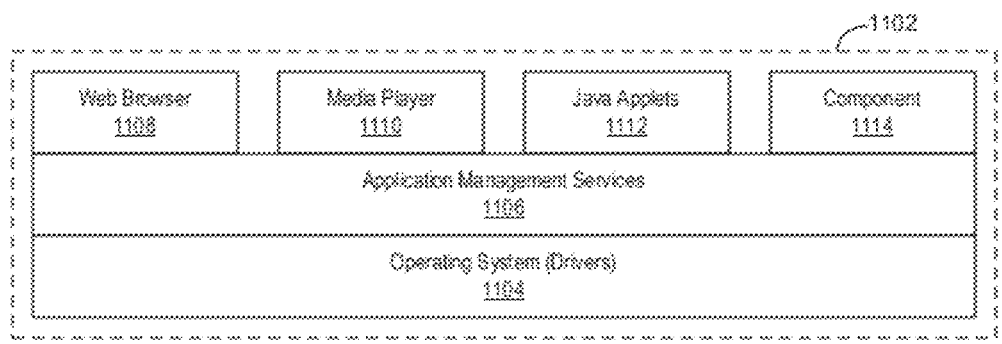
FIG. 11 is a simplified block diagram of a software environment that may be implemented by the DSP.

FIG. 11 illustrates a software environment 1102 that may be implemented by the DSP 1002. The DSP 1002 executes operating system drivers 1104 that provide a platform from which the rest of the software operates. The operating system drivers 1104 provide drivers for the UE 902 hardware with standardized interfaces that are accessible to application software. The operating system drivers 1104 include application management services (AMS) 1106 that transfer control between applications running on the UE 902. Also shown in FIG. 11 are a web browser application 1108, a media player application 1110, and Java applets 1112. The web browser application 1108 configures the UE 902 to operate as a web browser, allowing a user to enter information into forms and select links to retrieve and view web pages. The media player application 1110 configures the UE 902 to retrieve and play audio or audiovisual media. The Java applets 1112 configure the UE 902 to provide games, utilities, and other functionality. A component 1114 might provide functionality described herein. The UE 902, a base station 910, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD) digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for operating a user equipment (UE) based on a sounding reference signal (SRS) subframe configuration, the method comprising:
    defining user equipment (UE) specific Aperiodic Sounding Reference Signal (A-SRS) subframes within a radio subframe;
    performing a state base operation when defining the UE specific A-SRS subframes; and
    using, by the user equipment (UE), the UE specific A-SRS subframes,
    wherein the state base operation comprises configuring the UE with a periodicity and an offset within a set of cell specific SRS subframes of a radio frame, and
    wherein when a certain period is configured, the UE can schedule A-SRS in all cell specific SRS subframes in a radio frame, and
    when another period is configured, only one subframe can be scheduled within a set of cell specific SRS subframes in a radio frame for A-SRS transmission.

2. The method of claim 1 further comprising:
    performing a bit map operation when defining the UE specific A-SRS subframes.

3. The method of claim 2 wherein:
the bit map operation comprises using a predetermined number of bits for the UE-specific A-SRS subframe configuration and associating each bit with one subframe within a radio frame.

4. The method of claim 3 wherein:
when an $n^{th}$ bit is assigned a predefined value, then an $n^{th}$ subframe in a system frame is configured as an A-SRS subframe for the UE.

5. The method of claim 3 wherein:
when an $n^{th}$ bit corresponds to a subframe that is not configured as a cell specific SRS subframe, the $n^{th}$ bit is used to perform error detection and correction of the bit map operation.

6. The method of claim 3 wherein:
when an $n^{th}$ bit corresponds to a subframe that is not configured as a cell specific SRS subframe, the $n^{th}$ bit is used to carry additional information.

7. The method of claim 1 wherein:
a maximum period is related to the radio frame.

8. The method of claim 1 wherein:
a minimum offset is defined for the radio frame.

9. A method for sounding reference signal (SRS) subframe configuration comprising:
indicating to a particular User Equipment (UE) a set of UE-specific Aperiodic Sounding Reference Signal (A-SRS) subframes that are configured for the particular UE by:
(1) transmitting to the particular UE a first indication of which subframe in set Si is the initial subframe in the set of UE-specific subframes; and
(2) transmitting to the particular UE a second indication that each pth (P e {1, 2, . . . , 9}) subframe after the initial subframe in the set of UE-specific subframes in set Si is also included in the set of UE-specific subframes such that the particular UE utilizes the UE-specific A-SRS subframe configuration for signaling;
wherein the state base operation comprises configuring the UE with a periodicity and an offset within a set of cell specific SRS subframes of a radio frame, and
wherein when a certain period is configured, the UE can schedule A-SRS in all cell specific SRS subframes in a radio frame, and
when another period is configured, only one subframe can be scheduled within a set of cell specific SRS subframes in a radio frame for A-SRS transmission.

10. A method for sounding reference signal (SRS) subframe configuration comprising:
transmitting to a particular User Equipment (UE) an index value; and
using the index value at the particular UE to determine values Astart and Ainc, where Astart indicates which subframe in set Si is a starting subframe to include in a set of UE-specific A-SRS subframes and Ainc indicates that each subframe after the starting subframe in set Si that is separated by an integer multiple of Ainc is also included in the set of UE-specific A-SRS subframes, such that the particular UE utilizes the UE-specific A-SRS subframe configuration for signaling;
wherein the state base operation comprises configuring the UE with a periodicity and an offset within a set of cell specific SRS subframes of a radio frame, and
wherein when a certain period is configured, the UE can schedule A-SRS in all cell specific SRS subframes in a radio frame, and
when another period is configured, only one subframe can be scheduled within a set of cell specific SRS subframes in a radio frame for A-SRS transmission.

* * * * *